US007165053B2

(12) United States Patent
Beck

(10) Patent No.: US 7,165,053 B2
(45) Date of Patent: Jan. 16, 2007

(54) SYSTEM AND METHOD FOR PRE-FEEDING MAILPIECES, DETECTING THE PRESENCE OF HARMFUL MATERIALS IN THE MAILPIECES AND SORTING THE MAILPIECES

(75) Inventor: Christian A. Beck, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 950 days.

(21) Appl. No.: 10/172,708

(22) Filed: Jun. 13, 2002

(65) Prior Publication Data

US 2004/0039713 A1 Feb. 26, 2004

(51) Int. Cl.
*G06F 17/00* (2006.01)
*G07B 17/02* (2006.01)
*B07C 5/00* (2006.01)

(52) U.S. Cl. ....................... 705/401; 209/584; 700/223

(58) Field of Classification Search ................. 705/401
See application file for complete search history.

(56) References Cited

U.S. PATENT DOCUMENTS 4,831,555 A 5/1989 Sansone et al.
5,971,391 A 10/1999 Salomon et al.
6,003,857 A 12/1999 Salomon et al.
6,135,441 A 10/2000 Belec et al.
6,161,830 A 12/2000 Yap (Continued)

FOREIGN PATENT DOCUMENTS

WO WO 03/039307 * 5/2003

OTHER PUBLICATIONS

"Inidia: ECIL venture offers portable scanner", Business Line, Sep. 3, 2001.*

*Primary Examiner*—John W. Hayes
*Assistant Examiner*—Rutao Wu
(74) *Attorney, Agent, or Firm*—Alberta A. Vitale; George M. Macdonald; Steven J. Shapiro

(57) ABSTRACT

An embodiment of the system of the present invention generally comprises an automated mailpiece sorting apparatus and method and more particularly, the system generally comprises a pre-feeding apparatus, a diverter, a collection module, a mailpiece sorting apparatus. The pre-feeder apparatus comprises a pre-feeder and a singulator including a detection module. The pre-feeder apparatus is connected to the mailpiece sorting apparatus via a diverter. The diverter diverts hazardous mailpieces to the collection module and non-hazardous mailpieces to the mailpiece sorting apparatus. The mailpiece sorting apparatus comprises a feeder, an OCR system, a mailpiece transporter, bins for receiving sorted mailpieces, an OCR system for reading addressee information, an addressee database, a sort plan and a personal computer (PC) or microprocessor based control system. In an alternate embodiment a sanitizer is included downstream from the diverter and upstream from the sorting apparatus. The system provides for sanitization of mailpieces so as to help deter delays in incoming mail delivery caused by the presence of life harming material and sanitize the mail so as to protect the intended recipients from harm and protect the mail sorting apparatus from contamination.

4 Claims, 12 Drawing Sheets

U.S. PATENT DOCUMENTS

| | | | | |
|---|---|---|---|---|
| 6,217,020 | B1 | 4/2001 | Supron et al. | |
| 6,328,300 | B1 | 12/2001 | Stefan et al. | |
| 6,740,836 | B1 * | 5/2004 | Ryan et al. | 209/584 |
| 6,754,366 | B1 * | 6/2004 | Sansone | 382/101 |
| 6,765,490 | B1 * | 7/2004 | Lopez et al. | 340/632 |
| 6,867,044 | B1 * | 3/2005 | Cordery et al. | 436/1 |
| 6,888,085 | B1 * | 5/2005 | Spencer et al. | 209/584 |
| 6,905,661 | B1 * | 6/2005 | Ryan et al. | 422/300 |
| 2002/0126008 | A1 * | 9/2002 | Lopez et al. | 340/540 |
| 2003/0058099 | A1 * | 3/2003 | Lopez et al. | 340/540 |
| 2003/0082635 | A1 * | 5/2003 | Terry et al. | 435/7.1 |
| 2003/0115161 | A1 * | 6/2003 | Cordery et al. | 705/402 |
| 2003/0121839 | A1 * | 7/2003 | Ryan et al. | 209/589 |
| 2003/0122086 | A1 * | 7/2003 | Ryan et al. | 250/455.11 |
| 2003/0124039 | A1 * | 7/2003 | Ryan et al. | 422/292 |
| 2003/0125835 | A1 * | 7/2003 | William et al. | 700/223 |
| 2003/0136920 | A1 * | 7/2003 | Flores et al. | 250/455.11 |
| 2003/0145664 | A1 * | 8/2003 | Schwarz et al. | 73/863.22 |
| 2004/0020264 | A1 * | 2/2004 | Megerle | 73/19.01 |

* cited by examiner

SYSTEM AND METHOD FOR PRE-FEEDING MAILPIECES, DETECTING THE PRESENCE OF HARMFUL MATERIALS IN THE MAILPIECES AND SORTING THE MAILPIECES

FIELD OF THE INVENTION

The invention disclosed herein relates generally to automated mail sorting and more particularly, a system and method that detects the presence of hazardous materials in mailpieces and diverts the mailpieces from being sorted.

BACKGROUND OF THE INVENTION

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee (i.e. employee or department) in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business.

Various services are used in the United States and other countries for delivery of mail (incoming mail) to individuals and businesses to recipients to whom the sender does not want to deliver personally. These services include, for example, the United States Postal Service (USPS) and other courier services, e.g., Federal Express®, Airborne®, United Parcel Service®, DHL®, etc., hereinafter called “carriers”. Unfortunately, sometimes the delivered materials may be illegal and/or hazardous to the health of the recipient and to the party who is delivering the goods, e.g., life-harming. Examples of life-harming materials are explosives; gun powder; blasting material; bombs; detonators; smokeless powder; radioactive materials; ammunition; atomic weapons; chemical compounds or any mechanical mixture containing any oxidizing and combustible units, or other ingredients in such proportions, quantities, or packing that ignite by fire, friction, concussion, percussion or detonation of any part thereof which may and is intended to cause an explosion; poisons; carcinogenic materials; caustic chemicals; hallucinogenic substances; illegal materials; drugs that are illegal to sell and/or dispense; and substances which, because of their toxicity, magnification or concentration within biological chains, present a threat to biological life when exposed to the environment, etc.

After the Sep. 11, 2001, terrorist attack on the United States, someone and/or a group of people, have been adding harmful biological agents and/or explosives to the mail. The addition of harmful biological agents to the mail submitted to the USPS has caused the death of some people and necessitated the closure of some post offices and other government office buildings and has caused delays in the sortation and delivery of mail including the delivery of incoming mail to businesses. The addition of explosives to the mail has caused numerous injuries to individuals. Individuals who receive and handle mail are encouraged to use safety precautions such as: washing their hands thoroughly with soap and water after handling mailpieces; avoiding shaking mailpieces; avoiding bumping or sniffing mailpieces; and avoiding handling of mailpieces suspected of contamination. These measures can be impractical when the volume of mail such as the incoming mail at a business is large. Thus, there is an urgent need to exclude or detect life-harming materials that are included in the mail in such a way that the delivery of the mail is efficient, reliable and safe and thus does not to negatively impact the functioning of the business or other site where communications via the mail delivery system is utilized.

Various automated mail handling machines have been developed for processing incoming mail (removing individual pieces of mail from a stack and performing subsequent actions on each individual piece of mail). Generally, the mail handling machines separate individual mailpieces from a stack, read the mailpieces using an optical character recognition (OCR) system and compare the read information to an addressee database in order to determine the appropriate destination points for delivery of the mailpieces. The information is then transferred back to the sorting apparatus. These automated mail sorting apparatus do not contain the ability to detect and/or sanitize mailpieces suspected of containing life harming agents. Additionally, if these machines become contaminated, they are costly to decontaminate and the decontamination process also creates time delays in mail sortation and delivery.

Thus, there is an urgent need to exclude or detect life-harming materials that are included in the mail in such a way that the delivery of the mail is efficient, reliable and safe and thus does not negatively impact the functioning of the business. Thus, one of the problems of the prior art is that a system is not available for processing incoming mail and detecting and/or sanitizing mailpieces suspected of containing life harming agents. Therefore, a system and method of processing incoming mail is needed which integrates, detection of harmful content, or sanitization with the mailpiece processing so as to help deter delays in incoming mail delivery caused by the presence of life harming material and/or to detect and/or sanitize the mail so as to protect the intended recipients from harm or protect expensive mail sorting apparatus from contamination.

SUMMARY OF THE INVENTION

This invention overcomes the disadvantages of the prior art by providing a system for processing incoming mail which integrates pre-feeding and detection with mailpiece processing so as to help deter delays in incoming mail delivery caused by the presence of life harming material and may also sanitize the mail so as to protect the intended recipients from harm and protect expensive mail sorting apparatus from contamination. This in turn affords for less delays in mailpiece processing.

The present invention is directed, in general to automated mailpiece sorting apparatus and method and more particularly, a system for pre-feeding and detecting harmful materials in a mailpiece. The system generally comprises or pre-feeding apparatus, a diverter a collection module, a mailpiece sorting apparatus. The pre-feeder apparatus comprises a pre-feeder or first feeder module and a singulator module including a detector. The pre-feeder apparatus is connected to the mailpiece sorting apparatus via a diverter positioned downstream of the pre-feeder apparatus and upstream of the mail sorting apparatus. The diverter can divert hazardous mailpieces to a collection module and non-hazardous mailpieces to the mailpiece sorting apparatus. The mailpiece sorting apparatus comprises a feeder, an optical character recognition system (OCR) scanner, a mailpiece transporter, a sanitizer and compartments or bins for receiving sorted mailpieces, an OCR system for reading addressee information, an addressee database, a sort plan and a personal computer (PC) or microprocessor based control system. In an alternate embodiment a sanitizer is included downstream from the diverter and upstream from the mailpiece sorting apparatus. The sanitizer is used to sanitize mailpieces for which no hazardous material was detected to help to decontaminate the mailpieces from possible cross-contamination from hazardous mailpieces or from undetected hazardous material. In another embodiment of the present invention the system is contained in a sanitization area and clean room. In another embodiment of the present invention the system uses x-ray technology to determine the content of the mailpieces.

An advantage of the present invention is that it provides a system for decreasing delays in the mail delivery caused by the presence of biohazardous or explosive material in mailpieces. Another additional advantage of the present invention is that the negative impact of delayed mail delivery is reduced. Other advantages of the invention will in part be obvious and will in part be apparent from the specification. The aforementioned advantages are illustrative of the advantages of the various embodiments of the present invention.

DESCRIPTION OF THE DRAWINGS

The above and other advantages of the present invention will be apparent upon consideration of the following detailed description, taken in conjunction with accompanying drawings, in which like reference characters refer to like parts throughout, and in which.

Figure 1A:
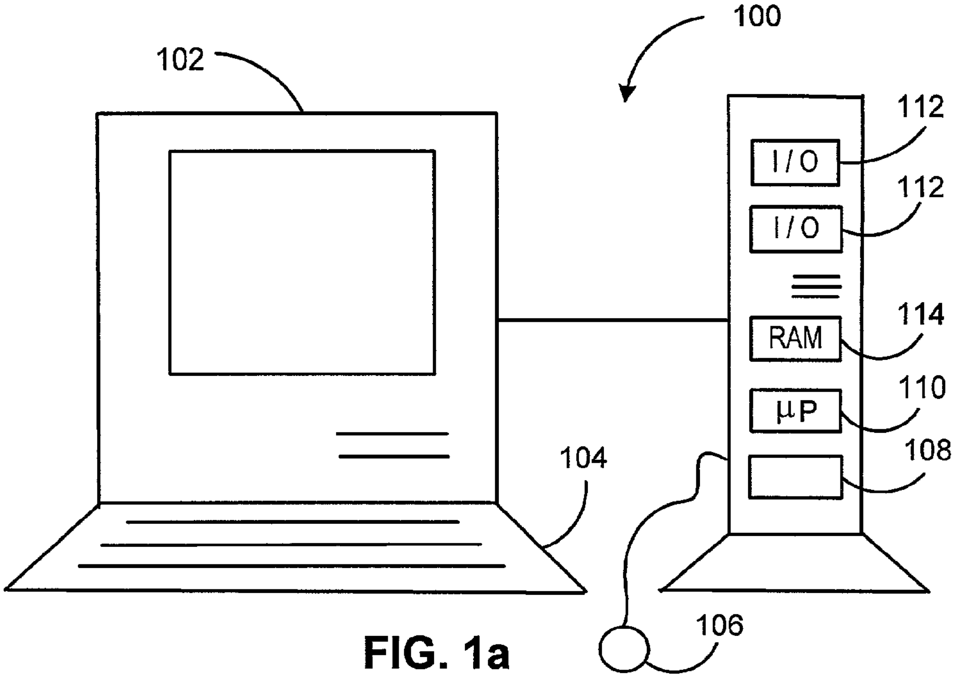
FIG. 1*a* is a block diagram that illustrates a computer system with which an embodiment of the invention may be implemented or controlled.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PRESENT INVENTION

In describing the present invention, reference will be made herein to FIGS. 1–6 of the drawings in which like numerals refer to like features of the invention. Features of the invention are not necessarily shown to scale in the drawings.

Automated Mailpiece Sorting Apparatus Overview

FIG. 1*a* is a block diagram that illustrates a computer 100 with which an embodiment of the invention may be implemented. Computer 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer 100 also includes a conventional processor 110, such as a Pentium® microprocessor manufactured by Intel, and conventional memory devices such as hard drive 108, floppy drive(s) 112, and memory 114.

Figure 1B:
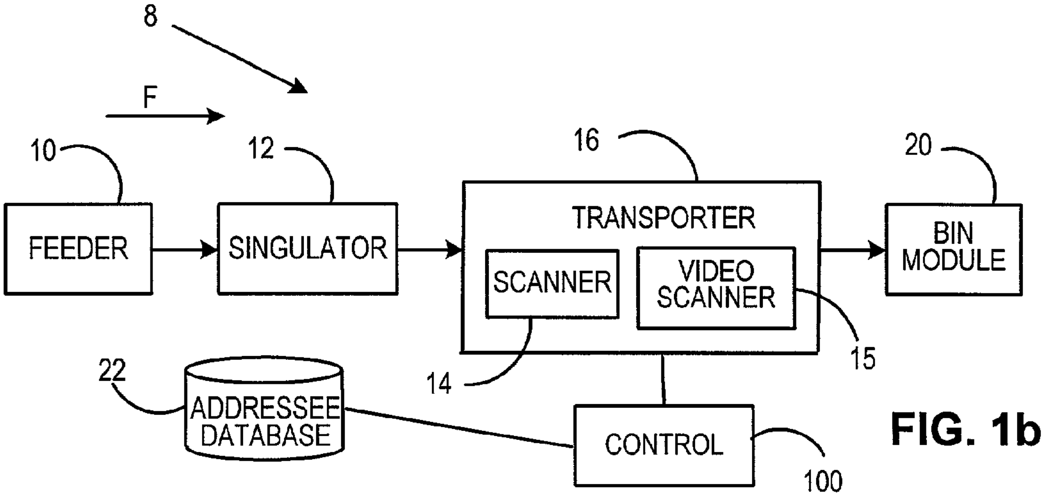
FIG. 1*b* illustrates an embodiment of the apparatus of the present invention including the connection of the computer system to a mail sorting apparatus.

The computer or control system 100 can be connected to a sorting apparatus 8 as illustrated, for example in FIG. 1*b*. The mailpiece sorting apparatus 8 may generally comprise a feeder 10, a line scan camera 14 (and optical character recognition (OCR) software, not shown), a mailpiece transporter 16, a bin module 20 (shown in FIG. 1*c*) with compartments or bins 18 for receiving sorted mailpieces 30 and the control system 100 which may be the microprocessor based personal computer system 100 described above. The control system 100 includes appropriate memory devices 108, 114 for storage of information such as an address database 22. One of ordinary skill in the art would be familiar with the general components of the mail sorting apparatus 8.

The feeder 10 of mailpiece sorting apparatus 8 is designed to feed mailpieces of varying sizes, thicknesses and finishes and therefore, can singulate and feed variously configured incoming mailpieces including, for example: envelopes of various sizes, mailpieces up to ¾ inches thick, magazines, and variously configured small packages. The feeder's capability to handle such various mailpieces make it well suited for the present invention because of the need to feed and singulate mail of various sizes, thicknesses and finishes prior to additional processing. Such mailpieces are difficult to feed with a typical feeding apparatus.

Exemplary aspects of the feeder 10 and singulator or separator module 12 of the system of the present invention are disclosed in the following: U.S. Pat. No. 5,971,391, issued Oct. 26, 1999 to Salomon et al. titled NUDGER FOR A MAIL HANDLING SYSTEM; U.S. Pat. No. 6,003,857, issued Dec. 21, 1999 to Salomon et al. titled SINGULATING APPARATUS FOR A MAIL HANDLING SYSTEM, U.S. Pat. No. 6,135,441 issued Oct. 24, 2000 to Belec et al. titled TWO STAGE DOCUMENT SINGULATING APPARATUS FOR A MAIL HANDLING SYSTEM; U.S. Pat. No. 6,217,020 issued Apr. 17, 2001 to Supron et al. titled METHOD AND APPARATUS FOR DETECTING PROPER MAILPIECE POSITION FOR FEEDING; and U.S. Pat. No. 6,328,300 issued Dec. 11, 2001 to Stefan et al. titled ALIGNER MECHANISM FOR A MAIL HANDLING SYSTEM and assigned to the assignee of the present invention and incorporated by reference herein.

The mailpiece sorting apparatus 8 and the OCR software may be used to determine the addressee of the mailpiece 30 or other information on the face of the mailpiece 30. The reading of various information may be performed with the assistance of intelligent character recognition (ICR) or imaging character recognition (OCR/IC) which may be part of the above mentioned OCR software and can read the various fields on the mailpiece 30.

Suspect/Hazardous Mailpieces

Figure 2A:
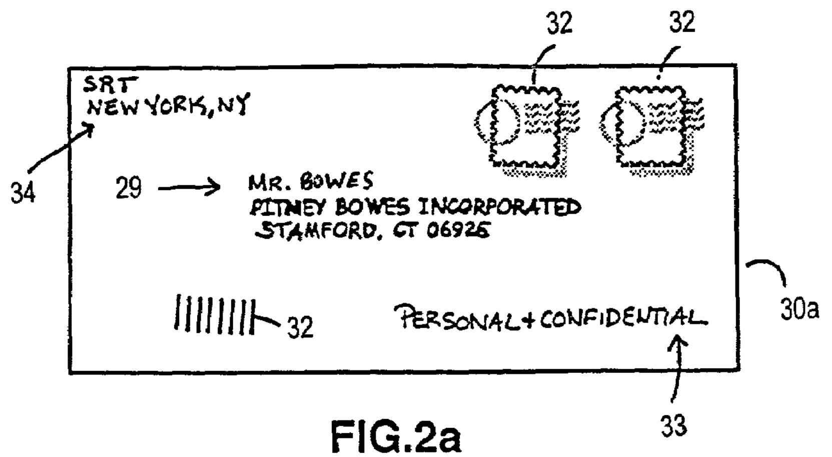
FIGS. 2*a*–*b* illustrates exemplary suspect or hazardous mailpieces.
Figure 2B:
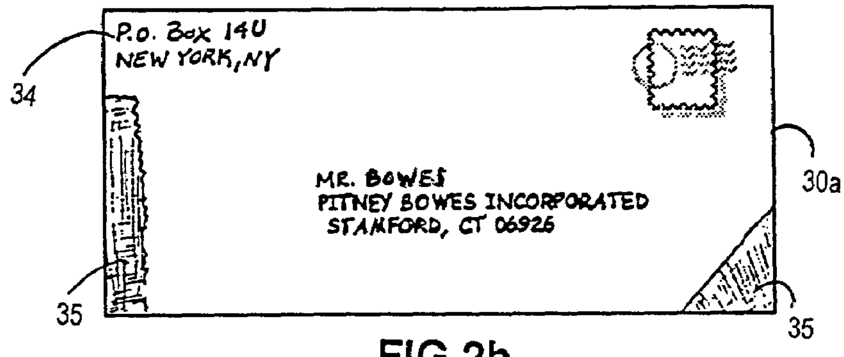

FIGS. 2*a*–*d* illustrates various examples of suspect or hazardous mailpieces 30*a* and trusted mailpieces 30*b*. FIGS. 2*a*–*b* represents possibly suspect and/or harmful mailpieces. The Postmaster General of the United States has sent a message to postal customers across the country with criteria for suspect mailpieces. This United States Postal Service (USPS) criteria includes: 1) mail that is unexpected or from someone that you do not know; 2) mail that is addressed to someone no longer at your address; 3) mail that is handwritten and has no return address or bears a return address that cannot be confirmed; 4) mail that is lopsided or lumpy in appearance; 5) mail that is sealed with excessive amounts of tape; 6) mail that is marked with restrictive endorsements such as "personal" or "confidential"; and/or 7) mail that has excessive postage. The mailpiece 30*a* of FIG. 2*a* is a possible suspect mailpiece because it has excessive postage 32 (i.e. multiple stamps), is addressed to an addressee 29 no longer at the address, bears the marking PERSONAL & CONFIDENTIAL 33 and has an unconfirmable return address 34 of SRT NEW YORK, NY. The mailpiece 30*a* of FIG. 2*b* is a possible suspect mailpiece because it bears an unconfirmable return address 34 of PO BOX 14U, NEW YORK, N.Y.; is addressed to an addressee 29 no longer at the address, and is sealed with excessive amounts of tape 35.

In addition to the USPS criteria, Pitney Bowes, a company providing, leading-edge global, integrated mail and document management solutions for organizations of all sizes, and the assignee of the present invention, provides criteria at its web site www.pb.com. The criteria for suspect mail includes: 1) packages with excessive postage, using postage stamps as opposed to meter indicia; 2) addresses which are poorly typed or handwritten, and have misspellings; 3) packages which have oily stains, crystallization on wrapper or strange odors; 4) mail containing no return address or a return address not consistent with postmark; 5) mail which is exceptionally large or is a lopsided package; 6) a package which is rigid, bulky or discolored; 7) a package which displays evidence of electrical wire or tin foil; 8) a package which makes a sloshing sounds or appears to contain liquid; and 9) packages with excessive wrapping materials, such as masking tape, strapping tape, or string. Other organizations, such as law enforcement agencies or investigation authorities are also providing criteria for determining suspect mail including the Federal Bureau of Investigations (FBI).

Figure 2C:
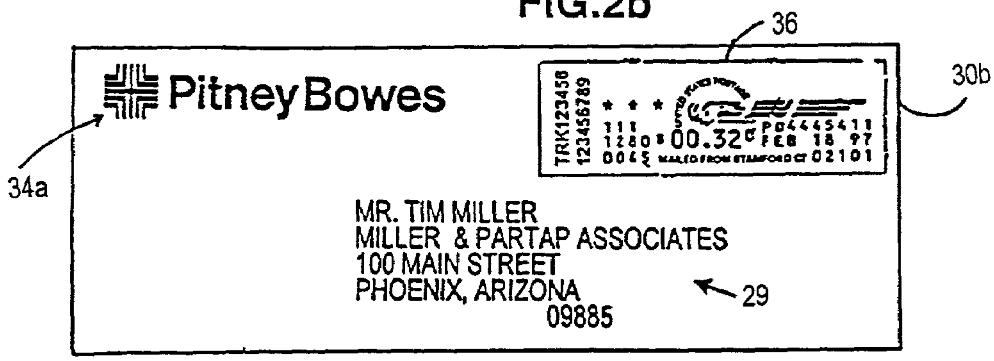
FIGS. 2*c*–*d* illustrates exemplary trusted mailpieces, which include Pitney Bowes postage indicia that includes origin information.
Figure 2D:
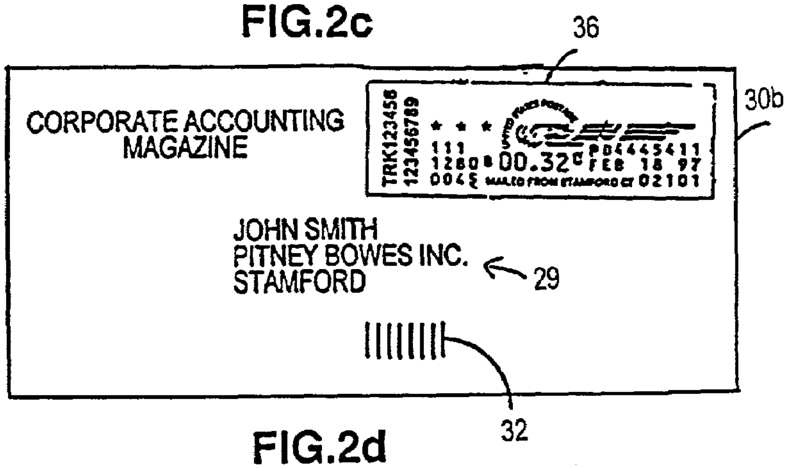

FIGS. 2*c*–*d* illustrates mail that is more trusted than those of FIGS. 2*a*–*b*. The mailpiece 30*b* is trusted because postage (indicia 36) has been fixed to the mailpiece using a postage meter such as a Pitney Bowes electronic postage meter. Each Pitney Bowes postage meter imprint, includes, a tracking number that identifies the original point of mailing so recipients of mail can feel more comfortable receiving the mail since each piece has a unique fingerprint. Pitney Bowes Galaxy™ Mailing Systems and Pitney Bowes DM Series™ Mailing Machines digital postage meters (not shown) can print indicia, which include various other information such as encrypted information in the indicia 36 of FIGS. 2*c*–*d*.

Figure 3A:
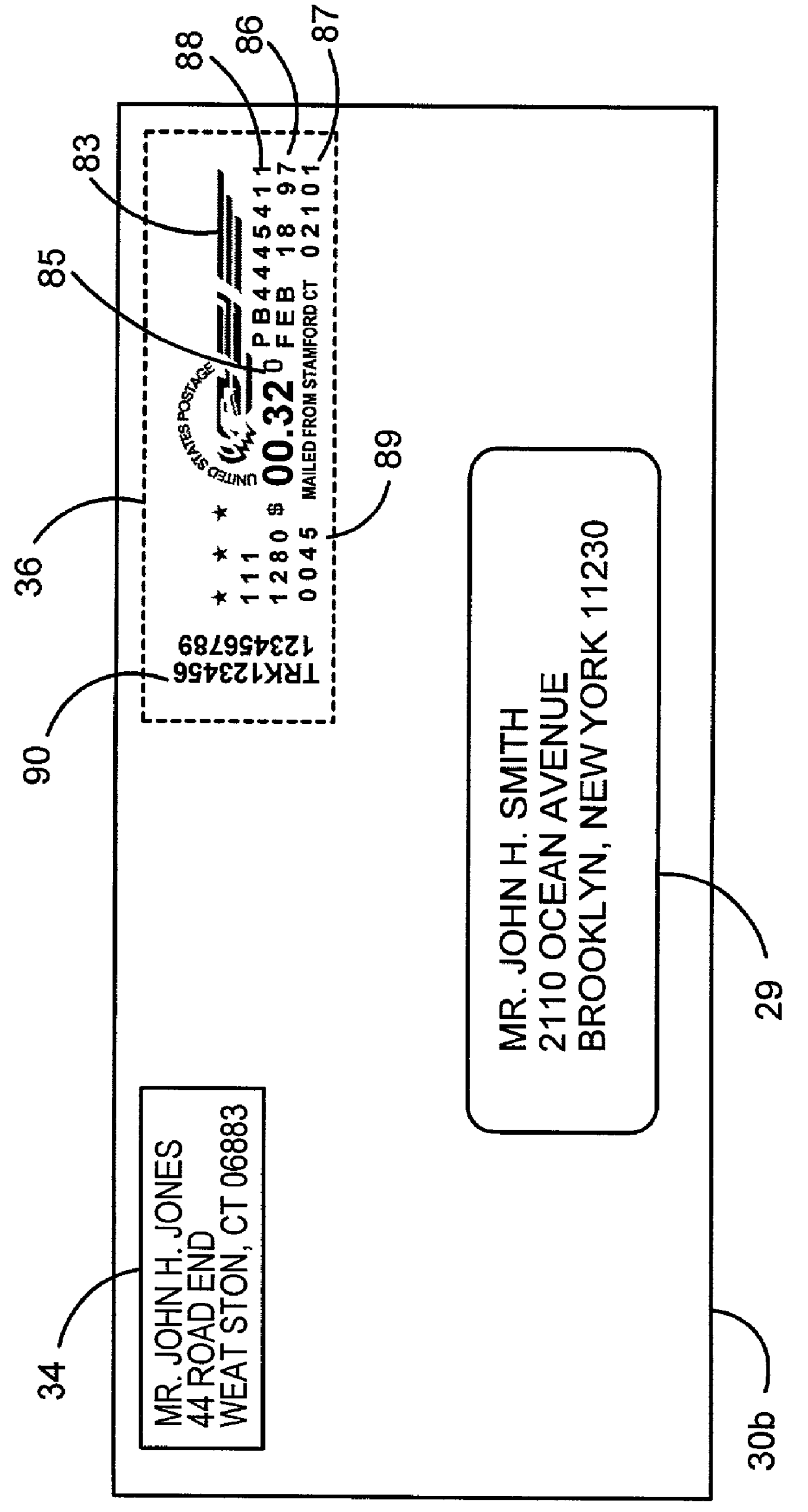
FIG. 3*a* is a drawing of a mailpiece containing a postal indicia that was affixed by an electronic meter.

FIG. 3*a* is a drawing of a trusted mailpiece containing a postal indicia that was affixed by a Pitney Bowes electronic meter. Mailpiece 30*b* has a recipient address field 29 and a sender address field 34. A postal indicia 36 is affixed to mailpiece 30. Indicia 36 contains a dollar amount 85; the date 86 that postal indicia 36 was affixed to mailpiece 30; the place (i.e. origin postal code or ZIP code) 87 that mailpiece 30 was mailed from; the postal meter serial number 88; an eagle 83; a security code 89; and, a tracking number 90. Security code 89 and tracking number 90 are unique numbers that are derived from address field 29 and information contained in the postage meter that affixed indicia 36. The manner in which security code 89 and tracking number 90 are obtained is disclosed in the Sansone, et al. U.S. Pat. No. 4,831,555 titled UNSECURED POSTAGE APPLYING SYSTEM, assigned to the assignee of the present invention and herein incorporated by reference.

Figure 3B:
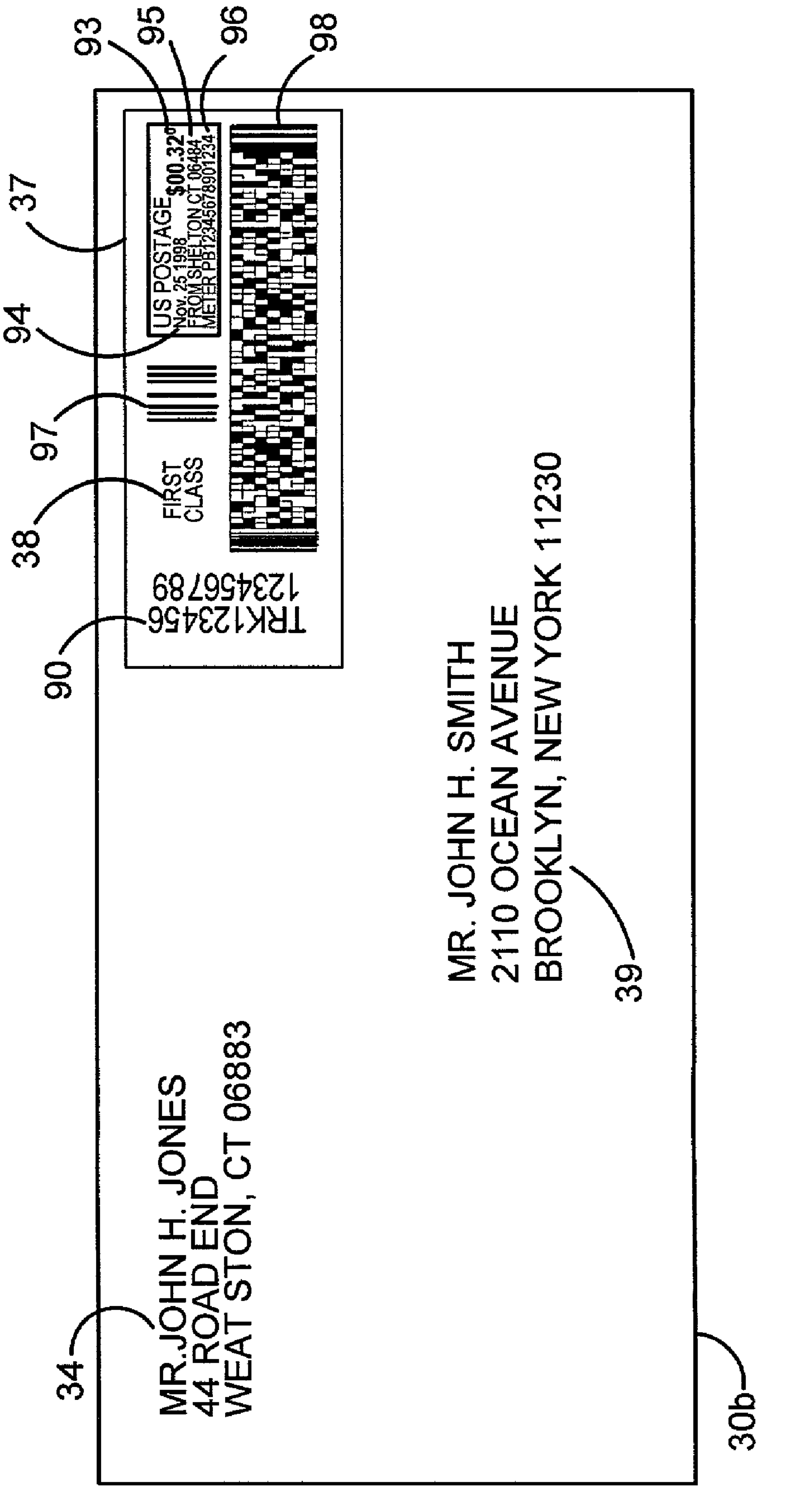
FIG. 3*b* is a drawing of a mailpiece containing an Information-Based Indicia.
Figure 4A:
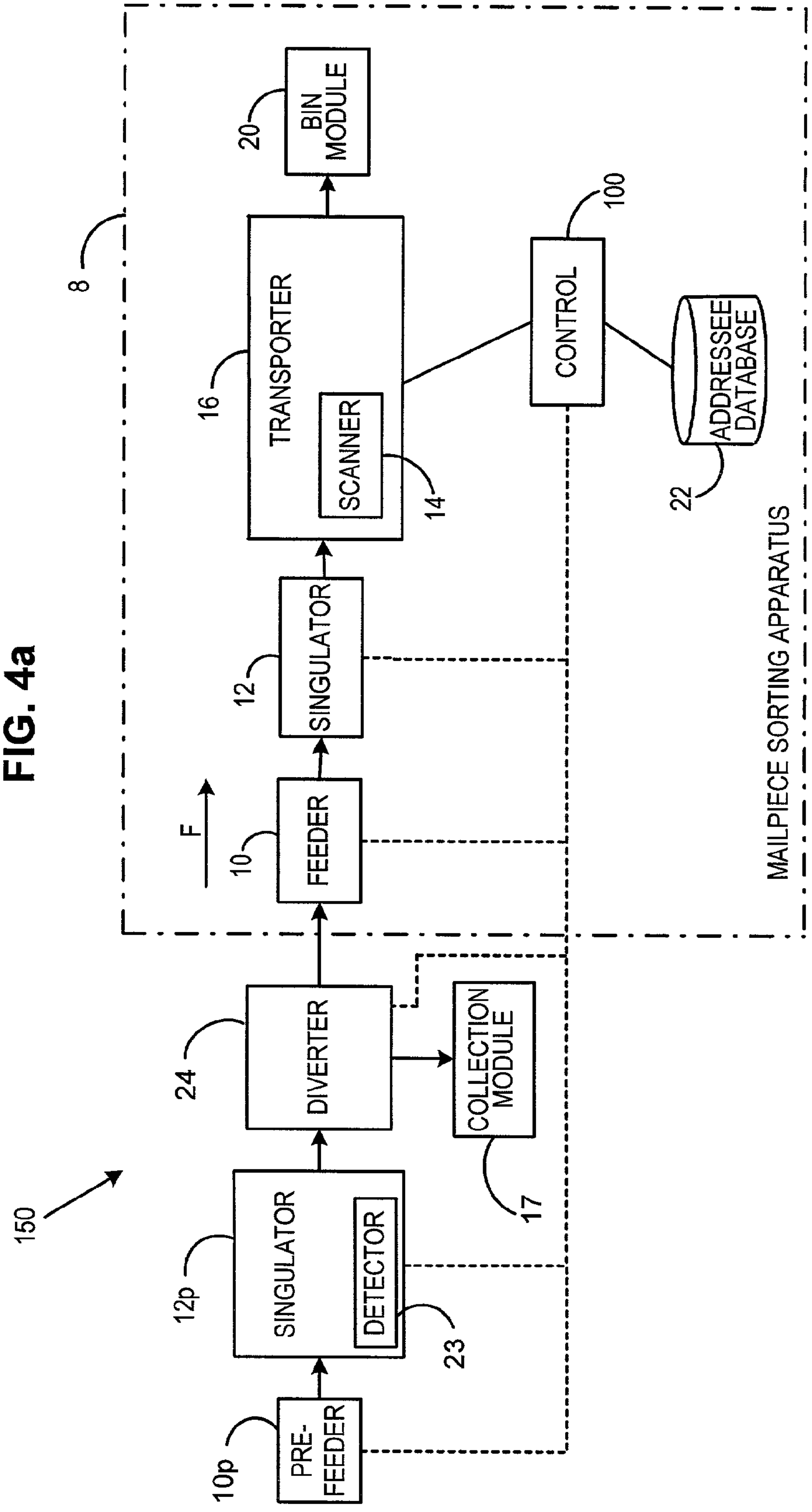
FIG. 4*a* illustrates an embodiment of the system of the present invention including an exemplary connection of the pre-feeding apparatus to the computer system and the mail sorting apparatus.
Figure 4B:
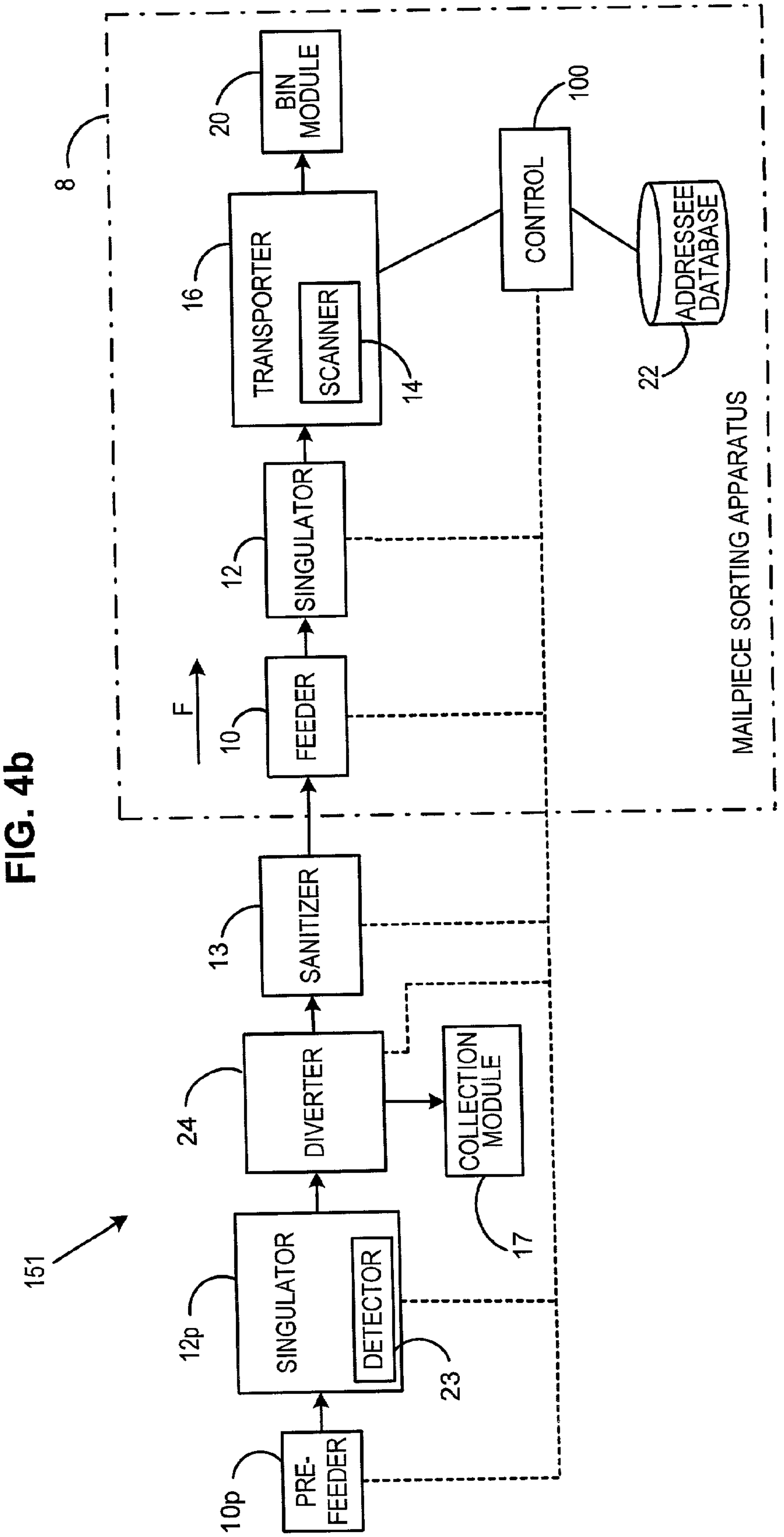
FIG. 4*b* illustrates an embodiment of the system of the present invention including an exemplary connection of the pre-feeding apparatus to the computer system and the mail sorting apparatus and sanitizer.

FIG. 3*b* is a drawing of a trusted mailpiece 30*b* containing an indicia 37. Mailpiece 30 has a recipient address field 29 and a sender address field 34. Mailpiece 30 contains USPS Information—Based Indicia (IBI) 37. The United States Postal Service Engineering Center has published a notice of proposed specification that describes an Information Based Indicia. The postal indicia 37 contains a dollar amount 93, the date 94, that the postal indicia was affixed to mailpiece 30, the place 95 that mailpiece 30 was mailed, the postal security device serial number 96, a FIM code 97; a 2D encrypted bar code 98; and a tracking number 90. Serial number 96 may be derived from bar code 98 or be equal to bar code 98. Bar code 98 is a unique number that is derived from address field 29 and information contained in the postal security device that affixed IBI 37. The manner in which information contained in bar code 98 is obtained is disclosed in the Sansone, et al. U.S. Pat. No. 4,831,555 titled UNSECURED POSTAGE APPLYING SYSTEM, assigned to the assignee of the present invention and herein incorporated by reference. Mailpiece 30*b* also contains an indication 38 of the class of mailpiece 30*b*.

In addition to offering criteria for suspect mailpieces, Pitney Bowes offers guide lines for mail security practices so that companies can establish trust with their recipients. The guidelines include metering your mail such as with the Pitney Bowes indicia 36, using a clear identifiable return address such as a printed logo 34*a*, using postcards, avoiding sending samples, using tamper resistant seals, and using tape printed with your company name to seal packages. The mailpieces of FIGS. 3*a* and 3*b* are examples of trusted mailpieces 30*b*.

System for Pre-Feeding, Detecting Hazardous Materials and Sorting Mailpieces

Figure 1C:
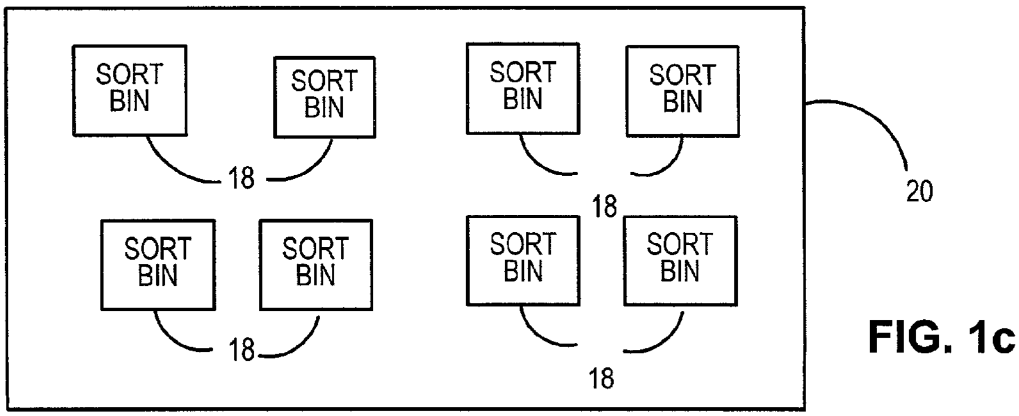
FIG. 1*c* is a block diagram illustrating a four bin module, which may be part of the mailpiece sorting apparatus used to perform an embodiment of the present invention.
Figure 5A:
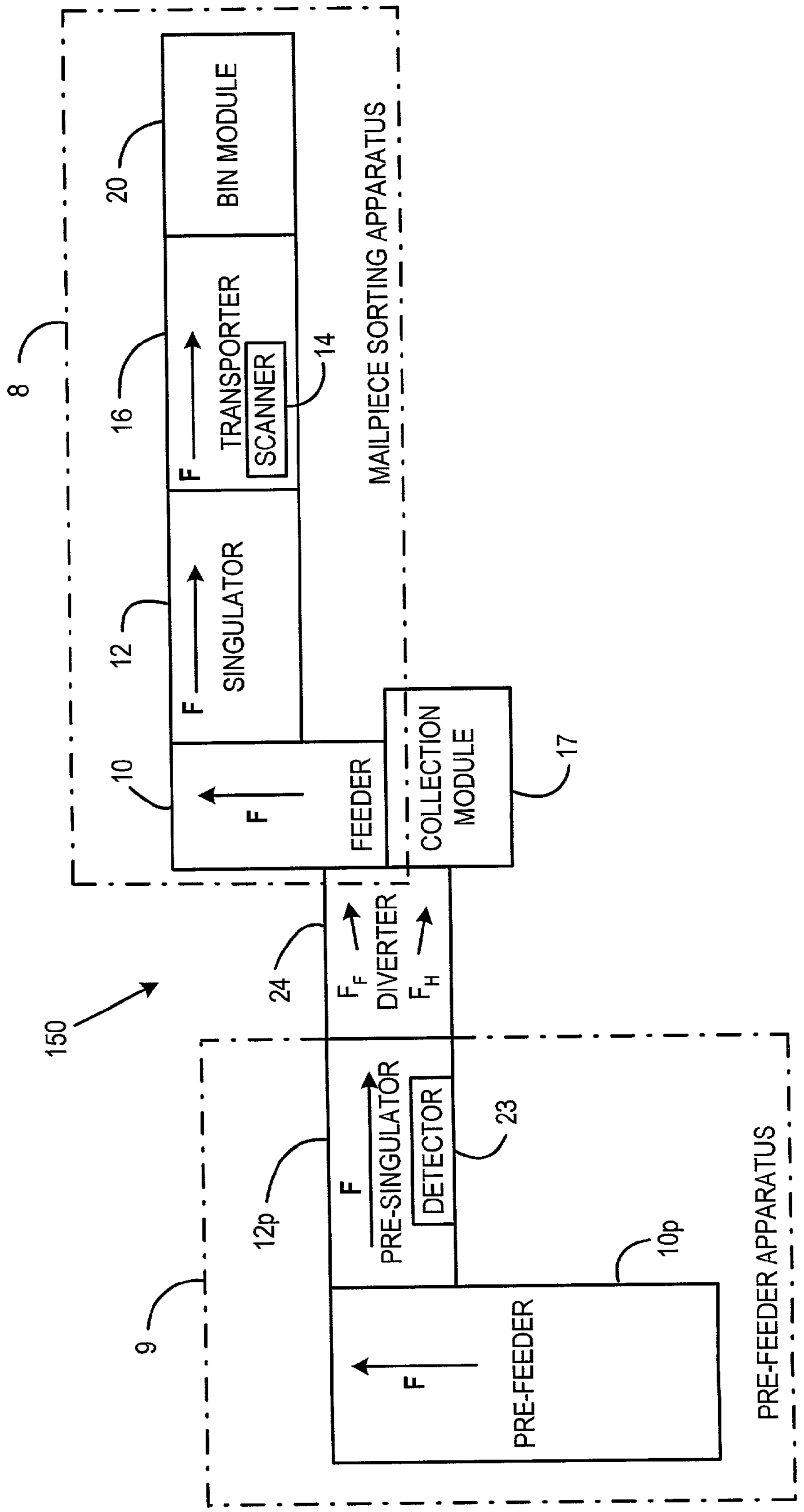
FIG. 5*a* illustrate an embodiment of the system of the present invention for pre-feeding mailpieces and detecting life harming substances in mail and diverting hazardous mail from the mail stream.
Figure 5B:
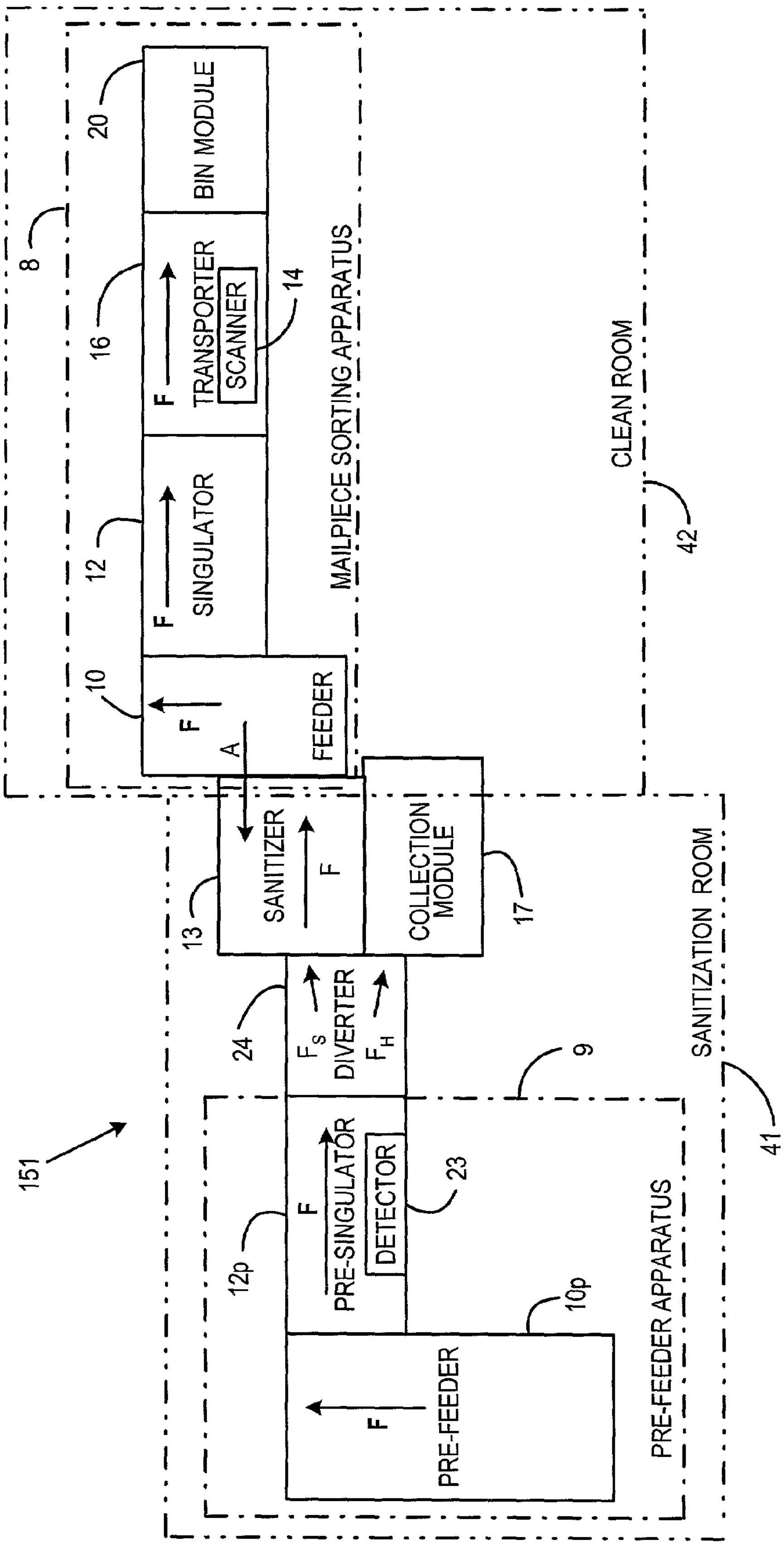
FIG. 5*b* illustrate an embodiment of the system of the present invention for pre-feeding mailpieces and detecting life harming substances in mail, diverting hazardous mail from the mail stream, and sanitizing mail that is diverted to a feeder/sorter.

FIG. 5*a* illustrate an embodiment of a system 150 of the present invention for pre-feeding mailpieces and detecting life harming substances in mail and diverting hazardous mail from the mail stream. FIG. 5*b* illustrate an alternate embodiment of a system 151 of the present invention for pre-feeding mailpieces and detecting life harming substances in mail, diverting hazardous mail from the mail stream, and sanitizing mail that is diverted to mail sorting apparatus 8. Mailpieces are referred to generally as mail or mailpieces 30 and includes mailpieces of various thicknesses and sizes such as mailpieces in an incoming mail stream. The system 150, 151 of the present invention includes a first or pre-feeder 10*p* for feeding mailpieces 30 from a stack (not shown), a pre-singulator 12*p* for separating mailpieces, a sanitizer 13 (shown in the embodiment 151 of FIG. 5*b*) for sanitizing mailpieces (sanitization can include for example killing biohazardous material in mailpieces 30 by means of microwave technology, irradiation, ultraviolet light, ozone, chemical mist or other technology that will kill the biohazardious material in the mailpiece without harming the letter/material content of the mailpiece). Many sanitization technologies can only sanitize objects of relatively slim thicknesses, therefore, by the present invention mailpieces are singulated prior to passing through sanitization area 44 (shown in FIG. 5*c*). The system 150, 151 further includes a transporter 16, a scanner 14 (such as a scanner for an optical character recognition (OCR) system), a control system 100 (such as the control system of FIG. 1*a*), an addressee database 22 (shown in corresponding FIGS. 4*a* and 4*b*) and a bin module 20 which is shown in FIG. 1*c* to include individual sort bins 18. While eight sort bins 18 are shown in FIG. 1*c* it should be understood that the number of sort bins 18 can be varied according to the needs of a sort plan used for determining the bin 18 for each of the mailpieces 30 in the stack.

In an alternate embodiment, shown with dashed lines in FIG. 5*b, a* sanitization room 41 could contain the feeder 10, singulator 12 and sanitizer 13 and a clean room 42 could include transporter 16, scanner 14, control 100 with database 22 and bin module 20. Other configurations for separating sections of the system 150 into sanitization room 41 and clean room 42 could be performed. The purpose of separating components of the system is to minimize exposure to and contain possible harmful elements that are emitted from or are in the mail stream. Operators stationed in the sanitization area 40 can be outfitted with personal protective equipment such as respirators, lab coats and protective clothing, eye and face protection and gloves. The clean room 42 is configured so that air flow between the clean room 42 and the sanitization room 41 is from the clean room 42 to the sanitization room 41 (thus the sanitization room 41 has a negative pressure as compared to the clean room 42). The direction of air flow from clean room 42 to sanitization room 41 is shown by arrow A. Appropriate filtration and sealing can be provided in transition area 43 of the feed path F that is a passage between the clean room 42 and sanitization room 41. A containment module (not shown), for example, can be placed around that area with filtration devices and an opening along the feed path F to accommodate the largest mailpiece, which can be sorted by the system. Operators of the sanitization room can be trained in appropriate safety practices including entrance and exit protocol, biohazard containment and proper attire.

Figure 5C:
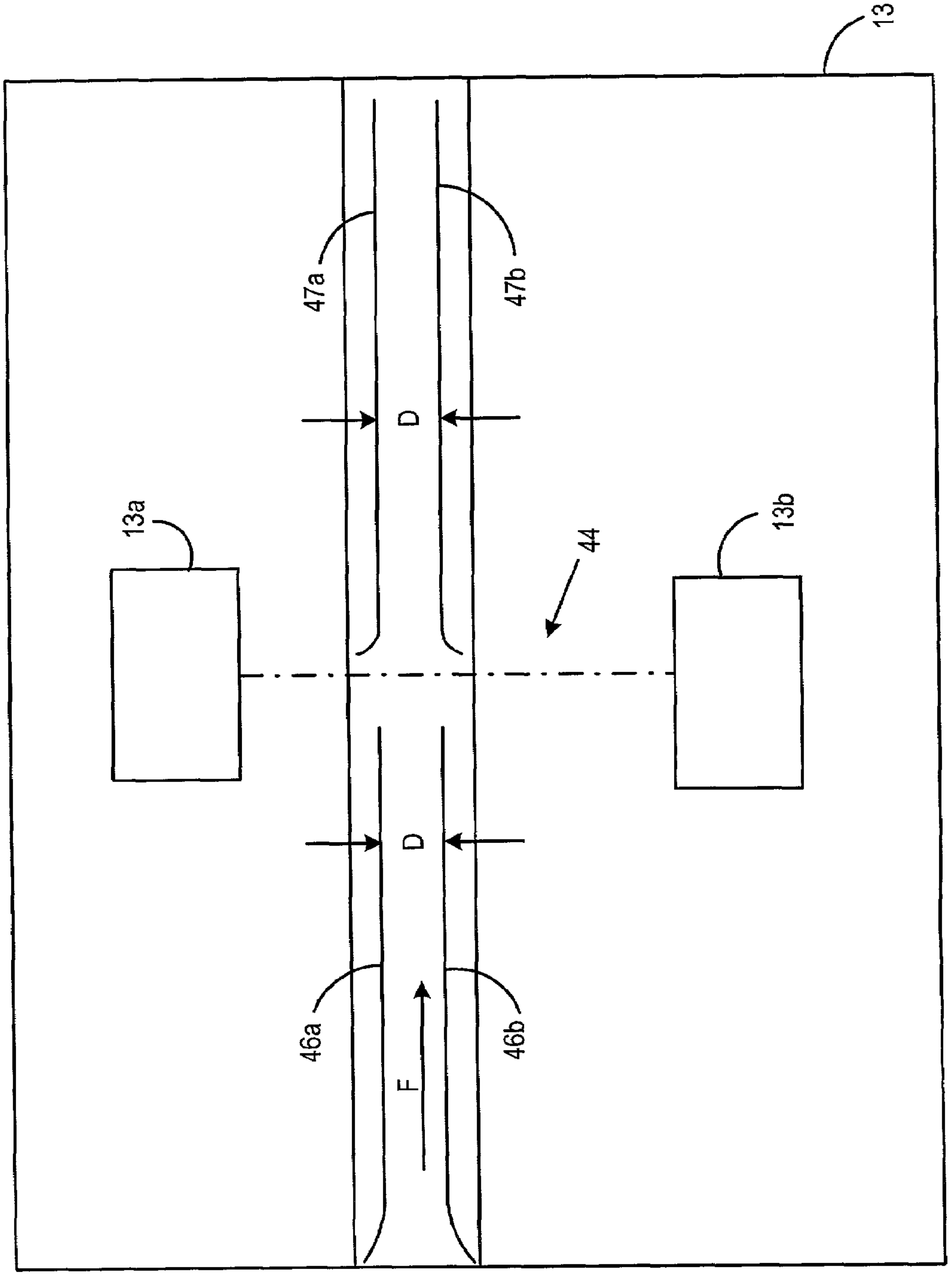
FIGS. 5*c*–5*e* illustrate embodiments of the system of the present invention for pre-feeding and sorting mail.

Referring to FIG. 5*c*, sanitizer 13, in addition to including sanitizing apparatus (shown generally as 13*a* and 13*b* with a sanitization area 44 denoted generally as a dashed line between modules 13*a* and 13*b*) described below can be configured in such a way as to transport singulated mailpieces past a sanitization area 44. This can be done for example using a configuration as shown in FIG. 5*c*, which includes a transport belt 45 for moving mailpieces and conveyor. In the sanitizer 13, the mailpieces 30 are driven along their bottom edges by the transport belt 45 along feed path F. A gap D between the guide walls 46*a* and 46*b* and guide walls 47*a* and 47*b* allows that the frictional forces between the mailpieces are almost nonexistent. Since the frictional forces tend to cause multi-mailpiece feeds, this configuration helps to prevent multi-mailpiece feeds from occurring. Furthermore, the sanitizing station acts as a buffer allowing mailpieces to deskew or register onto the transport belt 45. Subsequent to passage through the sanitizing station 13 the individual mailpieces are transported into the next segment of the system 150, the transport station 16.

In the preferred embodiment, the distance D between guide walls 46*a–b* and 47*a–b* is approximately 28 millimeters. This allows for the passage of ¾" thick mailpieces. However, other mailpiece thickness specifications and distances may be used. The minimum distance may be determined by the specification of the maximum width of mailpieces to be passed along the document feed path F. Additionally, the distance is determined by the minimum angle that the smallest mailpiece would have with respect to the transport belt 45 when leaning against guide walls 46*a–b* or 47*a–b*. The angle, if too small, would cause the mailpiece to lean below the sanitization area.

In an alternate embodiment (illustrated in FIG. 5*d*), instead of guide walls, vertically oriented transport belts 48*a–b* and vertically oriented transport belts 49*a–b* are positioned parallel to and on each side of the transport belt 45 along feed path F. The vertically oriented belts are driven in the direction of the feed path F and serve to move the mailpieces along the feed path F as well as provide support for the mailpieces in a similar fashion to the guide walls 46*a–b* and 47*a–b*. An expanded view of a typical configuration for vertically oriented transport belts 49*a–b* is shown in FIG. 5*e*. A similar configuration may be used for vertically oriented transport belts 48*a–b*.

The sanitizer 13 for sanitizing mailpieces can include, for example, technology for killing biohazardous material such as Anthrax, contained in mailpieces 30 by means of microwave technology, irradiation, ultraviolet light, ozone, chemical mist or other technology that will kill the biohazardous material in the mailpiece without harming the letter/material content of the mailpiece).

FIGS. 5*a* and 5*b* illustrate embodiments of the system 150, 151 of the present invention for first or pre-feeding mailpieces prior to feeding mailpieces into mailpiece sorting apparatus 8. The embodiments of system 150, 151 illustrated in FIGS. 5*a* and 5*b*, respectively, each comprise a first or pre-feeder 10*p, a* pre-singulator 12*p* with detection apparatus 23, a diverter 24, feeder 10 and singulator 12. Adjacent to the diverter is a collection module 17 for collecting hazardous mailpieces. In the embodiment of FIG. 5*b*, down stream of diverter 24, along feed path $F_S$ is sanitizer 13. FIG. 5*b* also illustrates collection module 17 downstream of diverter 24 along feed path $F_H$ followed by collection module 17 for collecting the sanitized mailpieces 30. The sanitizer 13 for sanitizing mailpieces can include, for example, technology for killing biohazardous material such as Anthrax, contained in mailpieces 30*a* by means of microwave technology, irradiation, ultraviolet light, ozone, chemical mist or other technology that will kill the biohazardous material in the mailpiece without harming the letter/material content of the mailpiece). The collection module 17 could be for example, a cart, a bucket, a stacker such as a horizontal or vertical stacker or other suitable component. Alternately, the diverter and collection module 17 can be integrated. In the embodiment of FIG. 5*a*, the diverter module is followed by a feeder module along feedpath $F_F$ and collection module 17 along feedpath $F_H$.

In the present embodiment of the system of the present invention where mailpieces are moved along the feed path F in a vertical or on edge orientation, the output or collection module 17 could be an on-edge mail stacking system comprising a transport followed by various stacking mechanisms. Generally, a multi-bin on-edge stacking system includes gating mechanisms, which divert specific mailpieces into predetermined stacker bins (not shown). Typically, mailpieces are transported vertically along a dual belt transport system, deflected into a stacker bin by a deflector mechanism, and guided into the bin by conventional guide and urging components. The objective of mail stacking systems is to produce one or more bundles of mailpieces.

In an alternate embodiment, shown with dashed lines to indicate pre-feeder apparatus 9, the sanitization room 41 can contain the separation module 9 (including first feeder 10*p* and singulator 12*p*) and sanitizer 13 and the clean room 42 can include mailpiece sorting apparatus 8. Other configurations for separating sections of the system 150 into sanitization area 40 and clean area 42 could be performed. The purpose of separating components of the system is to minimize exposure to and contain possible harmful elements that are emitted from or are in the mail stream. This includes minimizing exposure of expensive mailpiece sorting apparatus 8 to hazardous materials. Clean room technology is explained generally above, note that in FIG. 5*b* the direction of air flow is from clean room 42 to sanitization area 40 and is shown by arrow A.

FIGS. 5*a* and 5*b* illustrates embodiments of the system 150, 151 of the present invention for detecting life harming substances in mail and diverting such mail from the mail stream. The system 150 comprises a feeder 10, singulator 12, detector 23 for detecting the presence of harmful materials, diverter 24 for diverting mailpieces for which the presence of life harming materials has been detected (hereinafter hazardous mailpieces 30*b*). The diverter 24 diverts the hazardous mailpieces 30*b* to collection module 17 and is typically configured such that a finger or van (not shown) diverts mailpieces from the feed path F to an out sorting path $F_H$. In the embodiment 150 of FIG. 5*a*, mailpieces for which no presence of hazardous materials has been detected (hereinafter trusted mailpieces 30*a*) move along feed path $F_F$ to mailpieces sorting apparatus 8 where they are processed and delivered to the appropriate sort bin 18 (shown in FIG. 1*c*) of bin module 20. In the embodiment 151 of FIG. 5*b*, mailpieces for which no presence of hazardous materials has been detected (hereinafter trusted mailpieces 30*a*) move along feed path $F_S$ to sanitizer 13 and to mailpieces sorting apparatus 8 where they are processed and delivered to the appropriate sort bin 18 (shown in FIG. 1*c*) of bin module 20. In an alternate embodiment of the present invention, multiple diverters and stackers can be used such that each diverter is designated for diverting a particular category of mailpiece, such as, for example, explosives and biohazardous materials. As described above the control system 100, addressee database 22 (the addressee database has various fields that contain addressee information including for example an addressee name field and an associated addressee location field) and a sort plan are used to make a determination of the appropriate sort bin 18 (associated with the addressee location field) for delivery of the mailpiece.

Alternately, the diverter and stacker modules can be integrated. In the present embodiment of the system of the present invention where mailpieces are moved along the feed path in a vertical or on edge orientation, the output or collection module 17 could be an on-edge mail stacking system comprising a transport followed by various stacking mechanisms. Generally, a multi-bin on-edge stacking system includes gating mechanisms, which divert specific mailpieces into predetermined stacker bins (not shown). Typically, mailpieces are transported vertically along a dual belt transport system, deflected into a stacker bin by a deflector mechanism, and guided into the bin by conventional guide and urging components. The objective of mail stacking systems is to produce one or more bundles of mailpieces.

Figure 5D:
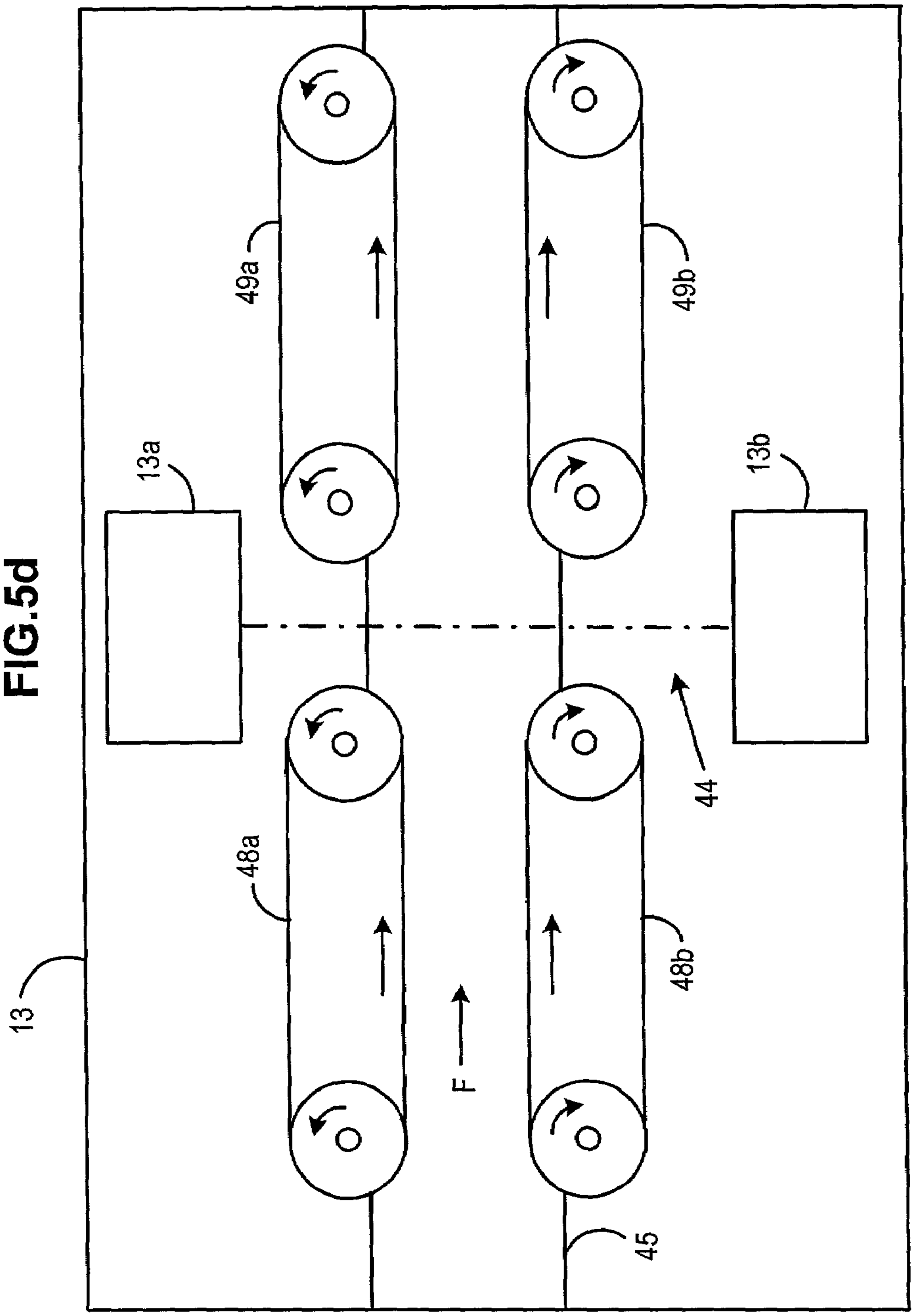
Figure 5E:
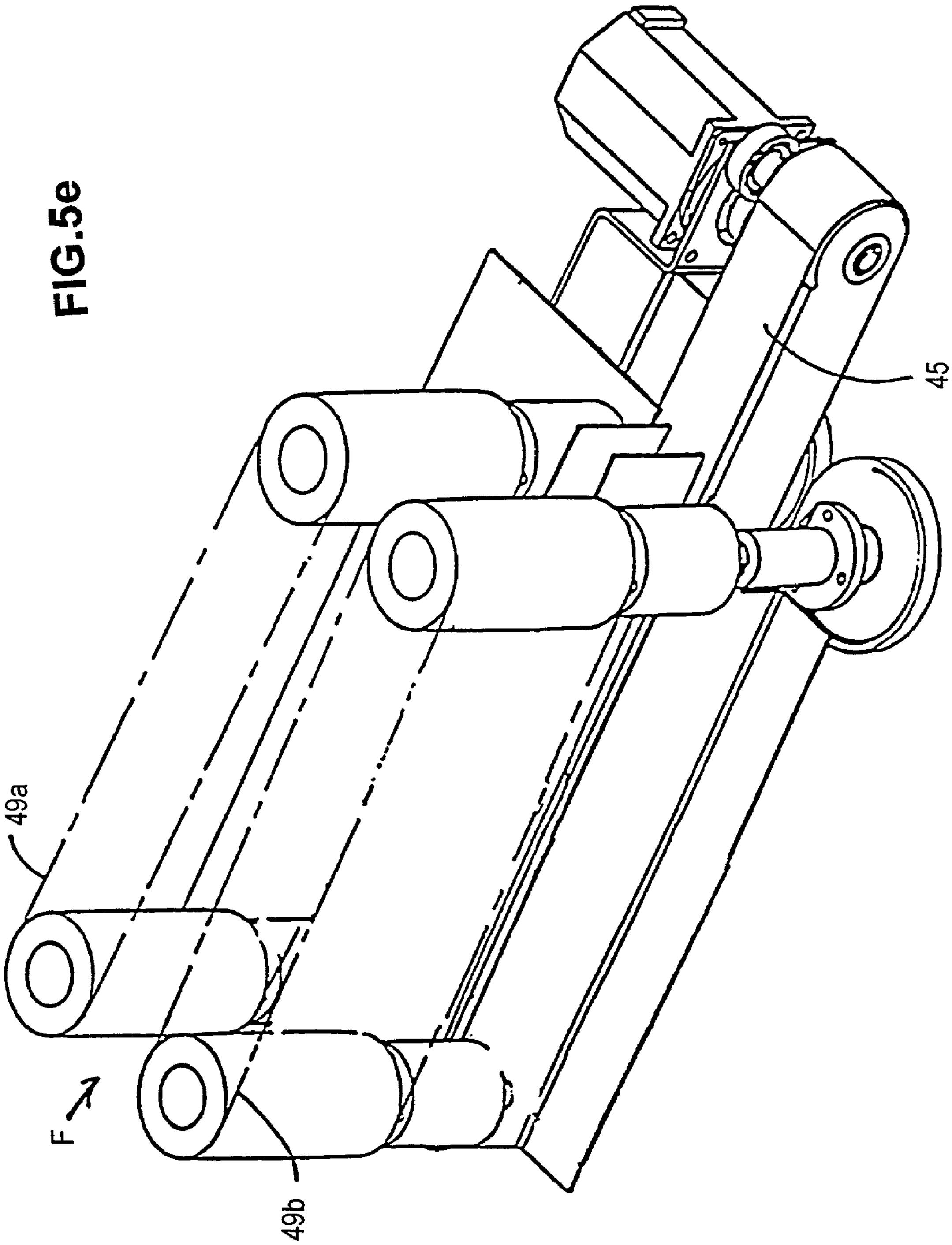

The detector 23 can be configured similarly to the sanitizers of FIGS. 5*c* and 5*d* so as to move mailpieces along feed path F the gap between walls or vertically oriented belts. Detection occurs in area 44 between components 13*a* and 13*b*, which in this embodiment are detection apparatus. The detector could be integrated into the pre-singulator 12*p* or could be a separate module. The detector is configured to detect for example biohazardous materials or explosives. The collection module 17 could be for example, a cart, a bucket, a biohazardous materials container, a stacker such as a horizontal or vertical stacker (the general components of a stacker for handling mixed sized mailpieces are described U.S. Pat. No. 6,161,830 titled METHOD AND APPARATUS FOR STACKING MIXED MAIL issued to Yap on Dec. 19, 2000, assigned to the assignee of the present invention and herein incorporated by reference) or other suitable component such as a bin for containing biohazardous materials or an explosives container.

In an alternate embodiment the detector 23 can be an x-ray module. X-ray technology can be used to screen mailpieces for suspicious content. X-rays generally indicate the density of materials contained in the article being x-rayed. An x-ray of a mailpiece can be used, for example, to detect materials such as powders, plastics, electronics and wires or other potentially life threatening materials. A method can be used to interpret an x-ray of the mailpieces by interpreting the x-ray image. If the x-ray image contains portions that are interpreted to be hazardous, then the system can divert the mailpiece to collection module 17.

The present invention provides detection of harmful materials and diversion of mailpieces 30*a* suspected of containing harmful materials from the mailstream. The embodiment of FIG. 5*b* addresses the issue of cross contamination of the mailpieces. Detection is performed at the pre-singulator module 12*p* and contaminated mailpieces are diverted along feedpath $F_H$ into collection module 17. Trusted mailpieces 30*b* which have successfully passed through detection (i.e. are not considered to be hazardous) move along feedpath $F_S$ to sanitizer module 13.

Method for Pre-Feeding, Detecting Hazardous Materials and Sorting Mailpieces

Figure 6:
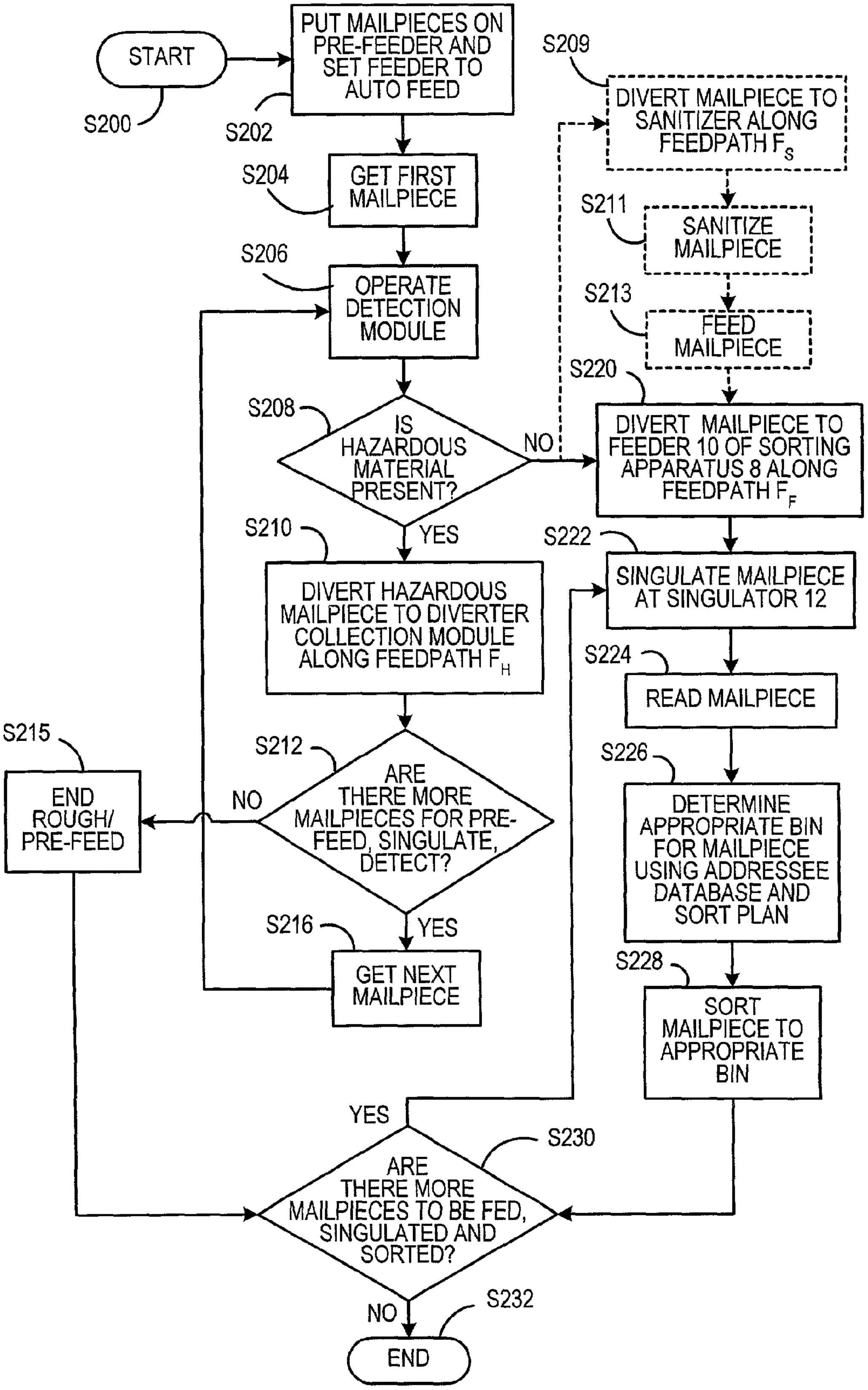
FIG. 6 illustrates embodiments of the method of the present invention for pre-feeding mailpieces and detecting hazardous mailpieces in a mailstream and diverting the hazardous mailpieces to a collection module.

FIG. 6 illustrates an embodiment of the method of the present invention for detecting hazardous mailpieces in a mail stream and diverting the hazardous mailpieces from being sorted. At step S200 the method begins. At step S202 a stack of mailpieces (not shown) is placed on the pre-feeder 10*p* of the system 150 (or alternately system 151) and the pre-feeder 10 is set to auto feed. At step S204 a first or lead mailpiece is fed from stack (not shown) to the pre-separator 12p. At step S206 the detection module 23 positioned in or adjacent to the pre-singulator 12p is operated to examine the mailpiece 30 for the presence of hazardous material. At step S208 a query is made as to whether hazardous material is present.

If at step S208 the answer is no, next at step S220 the trusted mailpiece 30b is moved to diverter 24 along feedpath $F_F$ (shown in FIG. 5a) to feeder 10 of mailpiece sorting apparatus 8. The mailpiece 30b is moved along the feedpath F and a leading mailpiece is obtained from the feeder 10. At step S222 the mailpiece 30 is singulated at singulator 12. The mailpiece is moved along feedpath F to transport area 16. At step S224 the mailpiece 30 is read using OCR scanner 14 and/or video scanner 15. At step S224 the appropriate bin 18 in sort bin module 20 is determined using addressee database 22 and the sort plan (not shown). At step S228 an appropriate bin is determined for the mailpiece. At step S228 the mailpiece is sorted to the appropriate bin 18, which could be OCR, reject bin 18a (used for mailpieces for which a bin determination could not be made for various reasons including the addressee could not be determined or the addressee is not in the sort plan). At step S230, the query is made as to whether there are more mailpieces to be sorted by mailpiece sorting apparatus 8. If the answer to the query is no, the method ends at step S232. If the answer to the query of step S230 is yes, then steps S222 through S230 are repeated until the answer to the query of step S230 is no and the method ends at step S232.

Returning to the query of step S208, if the answer to the query is yes, that hazardous materials are present in the mailpiece, then at step S210 the hazardous mailpiece 30a is diverted to collection module 17 along feedpath $F_H$. Next at step S212 the query is made as to whether there are more mailpieces for pre-feeding. If the answer to the query of step S212 is yes, then at step S216 the next mailpiece is obtained and steps S206 through steps S212 are repeated until the answer to the query of step S212 is no. If the answer to the query of step S212 is no, then there are no more mailpieces to be rough or pre-fed and rough or pre-feeding is ended at step S215. Next the query of step S230 is made as to whether there are more mailpieces to be sorted by mailpiece sorting apparatus 8. If the answer to the query of step S230 is no, the method ends at step S232. If the answer to the query of step S230 is yes, then steps S222 through S230 are repeated until the answer to the query of step S230 is no and the method ends at step S232.

In an alternate embodiment (which can be performed using the system 151 of FIG. 5b) of the method of FIG. 9 (shown with additional steps in dashed lines) if the answer to the query of step S208 is no then at step S209 the mailpiece is diverted to a sanitizer 13 along feedpath $F_S$. At step S211 the mailpiece is sanitized at step S211. At step S213 the mailpiece is moved from the sanitizer 13 to the mailpiece sorting apparatus 8 and steps S220 through S230 are repeated until the answer to the query of step S230 is no and the method ends at step S232.

The present invention provides a system and method for helping to deter delays in the mail delivery. Another additional advantage of the present invention is that the negative impact of delayed mail delivery is reduced. It further provides the ability to protect recipients from receipt of hazardous or life threatening mailpieces. While the present invention has been disclosed and described with reference to a several embodiment thereof, it will be apparent, as noted above that variations and modifications may be made therein. Those skilled in the art will also recognize that various modifications can be made without departing from the spirit of the present invention. For example, various detection apparatus may be used. As another example, the detection module may be implemented separate from the separator module. As yet another example, the diverter module can be integrated with the separator module. It is, thus, intended in the following claims to cover each variation and modification that falls within the true spirit and scope of the present invention. Therefore, the inventive concept in its broader aspects is not limited to the specific details of the preferred embodiments but is defined by the appended claims and their equivalents.

It should now be apparent that the invention substantially achieves all the above aspects and advantages. Additional aspects and advantages of the invention are set forth in the above description, and in part will be obvious from the description, or may be learned by practice of the invention. Moreover, the aspects and advantages of the invention may be realized and obtained by means of the instrumentalities and combinations particularly pointed out in the appended claims.

What is claimed is:

1. A system for detecting the presence of harmful materials in the mailpieces prior to sorting, the system comprising:

A detection and sanitization system positioned in a sanitization room comprising, a first feeding apparatus comprising a first feeder, a singulator downstream from the feeder and a detector positioned along the feed path of the singulator, the detection module for detecting the presence of harmful material in the mailpiece;

The detection and sanitization system further comprising a diverter positioned downstream from the singulator for diverting the mailpiece into a collection module if harmful material is detected by the detection module as being present with the mailpiece;

The detection and sanitization system further comprising a sanitizer, the sanitizer positioned down stream from the diverter; and A mailpiece sorting apparatus positioned down stream from the sanitizer in a clean room having a higher air pressure than the sanitization room whereby air flow is from the clean room to the sanitization room;

Wherein the sanitizer is positioned directly upstream from the mailpiece sorting apparatus for sanitizing mailpieces that have been diverted along the feed path and for delivering such mailpieces to the mailpiece sorting apparatus through a transition area including a feedpath opening operatively connecting the sanitization room to the clean room, The mailpiece sorting apparatus comprising a second feeder apparatus operatively connected to the sanitizer for receiving the mailpieces, and a second singulator operatively connected downstream from said second feeder apparatus, the second singulator for reading the mailpiece and determining a destination bin if the detection module does not detect the presence of harmful material with the mailpiece; and The mailpiece sorting apparatus further comprising a bin module comprising two or more destination bins for receiving a mailpiece after a destination bin has been determined by the system for reading the mailpiece and determining the destination bin.

2. The system as claimed in claim 1 wherein the system for reading the mailpiece and determining a destination bin comprises:

a control system for providing processing of information read from the mailpiece and an addressee database for providing addressee information which is compared to information read from the mailpiece in order to determine the appropriate addressee and destination bin for the mailpiece.

3. The system as claimed in claim 1 wherein the detector comprises at least one apparatus for the group consisting of: an x-ray apparatus, a laser, an infrared spectroscope or a scanner.

4. The apparatus as claimed in claim 1 whereby the harmful material being detected is at least one material from the group consisting of: explosives or biohazards.

* * * * *